Figure 4:
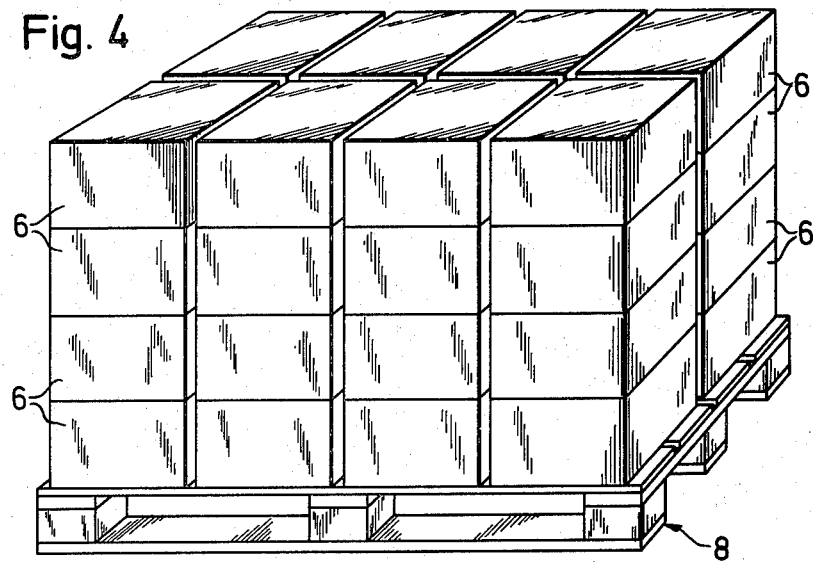

United States Patent [19]
Ernst et al.

[11] 3,924,737
[45] Dec. 9, 1975

[54] STORAGE-STABLE MULTI-COMPONENT THERMOSETTING RESIN SYSTEM

[75] Inventors: Otto Ernst, Pfeffingen; Konrad Meyerhans, Therwil; Eugen Kusenberg, Basel, all of Switzerland

[73] Assignee: CIBA-Geigy Corporation, Ardsley, N.Y.

[22] Filed: Mar. 27, 1974

[21] Appl. No.: 455,460

[30] Foreign Application Priority Data
Apr. 9, 1973 Switzerland.......................... 5047/73

[52] U.S. Cl................. 206/84; 206/219; 260/40 R; 424/20
[51] Int. Cl.². ........................................ B65D 81/32
[58] Field of Search ........ 206/84, 219, 223; 424/20; 260/40 R, 862

[56] References Cited
UNITED STATES PATENTS

| | | | |
|---|---|---|---|
| 2,791,326 | 5/1957 | Sparks et al. ......................... | 206/84 |
| 2,853,420 | 9/1958 | Lowey .................................. | 424/20 |
| 3,016,134 | 1/1962 | Borsuk................................. | 206/84 |
| 3,041,289 | 6/1962 | Katchen et al........................ | 206/84 |
| 3,489,271 | 1/1970 | Tissot.................................. | 206/223 |
| 3,784,005 | 1/1974 | McVay ................................ | 206/219 |

*Primary Examiner*—William T. Dixson, Jr.
*Attorney, Agent, or Firm*—Luther A. R. Hall

[57] ABSTRACT

According to this invention the individual components in the multi-component system are accommodated in a particular ratio in such a way that all substances which are not stable to atmospheric air and humidity and all substances which are not stable mechanically and any liquid substances are taken up or surrounded by a composition which is inert to air and humidity and is mechanically sufficiently stable. For example in a dragee-like arrangement the multi-component thermosetting resin system consists of a moulding, possessing at least one closed cavity, of at least one solid component (A) of this system and a filing to this cavity, comprising at least one solid or liquid reaction partner (B) of the component (A) for thermosetting crosslinking.

17 Claims, 7 Drawing Figures

Fig. 1
Fig. 1a     Fig. 1b     Fig. 1c
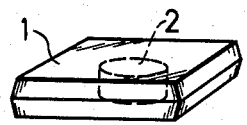 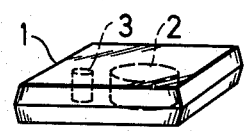 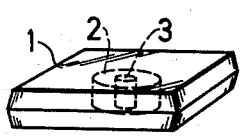
Fig. 2
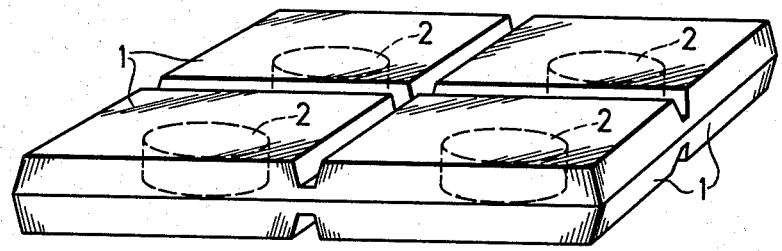
Fig. 3
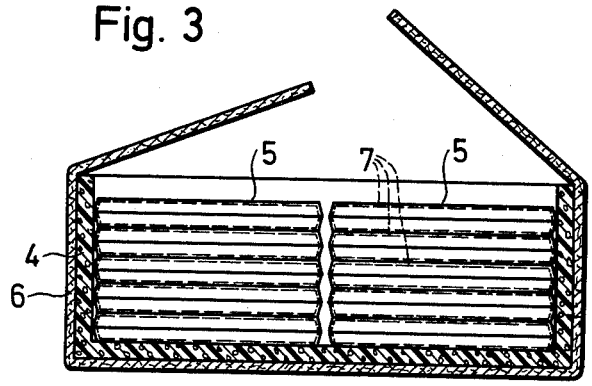

STORAGE-STABLE MULTI-COMPONENT THERMOSETTING RESIN SYSTEM

This invention is applicable preferably to epoxide resins and unsaturated polyesters.

Since the introduction of thermosetting synthetic resins, attempts have been made to find multi-component systems of unlimited storage stability, which, however, are processable in a simple manner, like one-component systems, display maximum reactivity during curing, and are insensitive to atmospheric humidity. Such compositions would, inter alia, provide great advantages in gluing, laminating, coating and especially casting, such as savings in processing equipment through the process of metering the individual components being superfluous, the avoidance of incorrect metering, reduction of the storage space required and diminished contamination of the environment.

Certain multi-component systems which can be processed like one-component systems are already known in the field of the epoxide resins, as compression moulding compositions, sintering powders and adhesives. They consist of a mixture of the actual epoxide resin, for example based on bisphenol A or other polyhydric phenols and dicyandiamide, Friedel-Crafts compounds or aromatic amines as curing agents.

However, the systems mentioned only possess limited stability on storage, and most of them are sensitive to atmospheric humidity. Furthermore, the curing reaction requires relatively high temperatures. Subsequent homogeneous mixing-in of fillers, coloured pigments, plasticisers and the like is made more difficult. In addition, such multicomponent systems are restricted to quite specific epoxide resin systems.

In part, such multi-component systems are unsuitable for use as casting resins. Where dicyandiamide is used in such systems, inhomogeneous melts result, since dicyandiamide is sparingly soluble in the melt. Ultimately, materials with poor electrical and mechanical properties result.

In addition, the production of such systems very frequently requires major amounts of solvents which can only be removed from the composition with the greatest of difficulty and the last traces of which prove highly objectionable during processing, reduce the quality, for example by increasing the shrinkage and lowering the mechanical properties and chemical resistance, and cause bubble formation.

Storage-stable multi-component systems which can contain inherently very reactive previously weighed-out individual components are also already known. These components are preferably packaged in sachets of flexible plastics, and in particular the resin component is separated from the curing agent component by a barrier or the curing agent component, packaged in a plastic sachet or a glass ampoule, is embedded in the resin component. Such commercially available forms are marketed, for example, as compositions for casting around cables, or for the consolidation of bore holes.

When using flexible sachets and flexible barriers, there is the danger that the components diffuse through the wall of the sachet or wall of the barrier or that the barrier is released during transport, especially in the case of sizable packages. This leads to objectionable contamination or localised curing which can make such a package unusable.

Furthermore, atmospheric humidity can penetrate into the sachet and extensively modify or even inactivate the system or individual components.

When using multi-component systems for consolidating bore holes the procedure is, for example, that a greater or lesser number of sachets is introduced into the bore hole, depending on the size of the latter, and the plastic casings are subsequently destroyed mechanically (for example by means of a drill) and the components are mixed. These systems suffer from the additional disadvantage that the packaging material (the plastic sachets) remains in the curing composition. This means that these systems cannot be used at all in cases in which the mechanical properties and electrical properties have to meet special requirements. For example, if it were desired to use these systems as casting resins for the manufacture of mouldings it would be necessary to provide expensive equipment for destroying the sachets and for subsequently removing them, for example by filtration, from the melt which is already undergoing reaction.

It is the object of the invention to provide storage-stable multi-component thermosetting resin systems which permit streamlined and unhampered production of materials with high grade mechanical and electrical properties. In particular it is intended that the hazard of incorrect metering, already mentioned, and any problems resulting from reactants or packaging materials not dissolved or not dispersed in the reaction composition, should be excluded. It should be unnecessary to employ expensive metering devices.

The object of the invention has been achieved by a special spatially dividing arrangement of the specific reactants in a moulding.

In effect, the subject of the invention is a storage-stable multi-component thermosetting resin system consisting of a moulding, possessing at least one closed cavity, of at least one component (A) of this multicomponent system, the component being solid at room temperature, inert to atmospheric air and fusible through raising the temperature, and a filling of this cavity, comprising at least one solid or liquid reaction partner (B) of the component (A) for thermosetting resin crosslinking, preferably at temperatures above 20°C, with, optionally, both the component (A) and the component (B) or one of the two components containing customary additives to the mixture, such as fillers, plasticisers, dyestuffs and catalysts, accelerators and inhibitors of the curing reaction, and the ratio of the amounts of the component (A) to component (B) and optionally to the catalysts, accelerators and inhibitors in this multi-component system preferably being the same as in customary thermosetting resin processing of the particular corresponding mixtures.

The general inventive concept is that in the multi-component system the individual components are accommodated in a particular ratio in such a way that all substances which are not stable to atmospheric air and humidity and all substances which are not stable mechanically and any liquid substances are taken up or surrounded by a composition which is inert to air and humidity and is mechanically sufficiently stable. This surrounding composition, which contains at least one component (A) or consists of at least one component (A) must be so stable that the multi-component system withstands stacking, storage and also transport (for example in containers) without being destroyed.

The reactive components (A) which participate in the build-up of the moulding are solid at room temperature and are fusible by raising the temperature. In principle, the presence of liquid components (A) in the composition would also be possible to a limited extent provided that the strength and inertness of the moulding are not reduced substantially. The component (B) of the multi-component system, which is present in the cavity and is required as the reaction partner of component (A) so as to produce thermosetting resin cross-linking at elevated temperature, can be sensitive or reactive towards atmospheric air and especially towards atmospheric humidity, or can be insensitive in this respect. The component (B) is preferably solid at room temperature and should not react with the partner substance (component (A)) at room temperature. Reaction should only occur at a higher temperature or in the fused state.

In addition to the component (B), the cavity of the moulding according to the invention can also contain yet further components (B) of similar chemical reactivity and can also contain catalysts, accelerators and inhibitors for the curing reaction, and customary additives to the mixture. However, liquid components (B) are only suitable for the system according to the invention if a diffusion of this liquid into component (A) virtually does not occur. To this extent, the use of solid components (B) represents a preferred form of the present invention.

Customary additives for mixing with components (A) and (B) according to the invention are fillers, agents for conferring flexibility, plasticisers, light stabilisers or heat stabilisers, dyestuffs, catalysts, accelerators, inhibitors and the like. If the total multi-component system according to the invention contains major amounts of fillers, dyestuffs or the like, it is desirable that the latter should be present uniformly distributed both in the component (A) and in the component (B). In some cases, such as, for example, if there is the danger of particularly intense diffusion of the accelerators and curing agents or if liquid components are used as the filling in the moulding according to the invention, it is desirable to accommodate the activating or inhibiting additives in only one of the components (preferably in a solid component) and not to distribute them uniformly over this component. For example, according to the invention it is in principle also possible for the moulding of the component (A) which is solid at room temperature and inert to atmospheric air to contain, in addition to at least one closed cavity for receiving the reactant (B), also at least one cavity in which further constituents of the mixture, especially accelerators, activators and inhibitors for the thermosetting resin curing reaction, are accommodated.

If the filling of component (B) in the closed cavity of the moulding is a solid composition, this filling can also possess cavities which can serve to receive constituents of the mixture, for example in the form of a pill or a tablet.

A preferred form of this invention consists of multi-component systems which contain, as component (A), a solid polyepoxide compound, and as component (B), a curing agent for epoxide compounds and/or a catalyst for the anionic or cationic polymerisation of the epoxide compounds. The solid component (A) can also be composed of a mixture of several polyepoxide compounds and can furthermore additionally contain uniformly distributed monoepoxide compounds and (except for curing agents or catalysts for ionic polymerisation) all customary additives for epoxide resins.

The ratios of the amounts of the epoxide compounds to the curing agents or catalysts in the multi-component thermosetting resin systems according to this preferred form of the invention are in general the same as with the customary epoxide resin mixtures.

The longest processing time is in that case achieved if first the resin component, then the curing agent component and only lastly the catalyst or accelerator melts.

Solid polyepoxide compounds which can be used are both polyglycidyl compounds and epoxidised olefinic compounds. Here again, the conditions which apply are that the substances are mechanically sufficiently stable and are inert towards atmospheric air.

Preferably, polyglycidyl compounds, especially bisphenol A types which have an epoxide content of 2.2 to 2.7 epoxide equivalents/kg, are employed as polyepoxides.

The following substances should be mentioned as further examples of suitable polyepoxide compounds: triglycidyl isocyanurate, glycidylated novolacs and the glycidyl compounds containing hydantoin rings. An example of the last-mentioned compounds is glycidylated methylenebis-hydantoin.

Further preferred compounds used for the multi-component system according to the invention are pre-condensates of low molecular polyepoxide compounds and polycarboxylic acid anhydrides or aromatic polyamines, preferably with 2 primary amino groups, and with epoxide contents of 5.0 to 4.0 epoxide equivalents/kg.

Curing agents which can be used for these epoxide resin multi-component systems according to the invention (that is to say as component (B)) are, in particular, solid anhydrides of organic polycarboxylic acids such as, for example, phthalic anhydride, tetrahydrophthalic anhydride, hexahydrophthali anhydride, 1,4,5,6,7,7-hexachloro-bicyclo-(2,2,1)-5-heptene-2,3-dicarboxylic acid anhydride, pyromellitic dianhydride and trimellitic anhydride as well as mixtures of these substances. Further suitable curing agents are organic substances with active hydrogen atoms such as, for example, primary and secondary amines. The following substances should be mentioned as examples of such amines: 4,4'-diaminodiphenylmethane, 4,4'-diaminodiphenyl ether, 4,4'-diaminodiphenylsulphone and the phenylenediamines.

Polyalcohols, polyesters and polyamides should also be mentioned as curing agents in this context.

Suitable catalysts for the ionic polymerisation are, as is known, Lewis acids, such as boron trifluoride, sulphonic acids and phosphoric acids, alkalis and dialkylaminomethylphenols. However, according to the invention only solid catalysts, such as, for example, sulphonic acids and dialkylaminomethylphenols, can be employed.

A typical example of an epoxide resin multi-component system according to the present invention is the combination of a bisphenol-A epoxide resin with phthalic anhydride as the curing agent. In such a system, 0.6 to 1.5, preferably 0.8 to 1.1, equivalents of acid anhydride groups should be present per 1 equivalent of epoxide group.

According to a preferred form of the multi-component thermosetting resin systems according to the invention, the latter consist of a solid polyglycidyl compound which represents the component (A), and a curing agent (component (B)), containing active hydrogen atoms, for the epoxide compound, with the multi-component system containing 0.8 to 1.2 equivalents of active hydrogen atoms per 1 equivalent of epoxide groups.

Particularly advantageous systems are obtained if the component (A) is a mixture of 100 parts by weight of a bisphenol-A epoxide resin having an epoxide content of about 2.2 to 2.7 epoxide equivalents/kg and up to 400 parts by weight of pulverulent silica, preferably quartz powder, and if the component (B) is a mixture of 10 to 40 parts by weight of phthalic anhydride and up to 400 parts by weight of pulverulent silica, preferably quartz powder.

In principle, the multi-component system according to the invention can, in the case of an epoxide resin system, also have the converse composition, that is to say the component (A) consists of a curing agent which is solid at room temperature and inert towards atmospheric air and the component (B) consists of a polyepoxide compound or of a mixture of epoxide compounds containing at least one polyepoxide compound. For such "converse" multi-component systems, the following are examples of curing agents which can be used: 4,4'-diaminodiphenylmethane, 4,4'-diaminodiphenylsulphone, pyromellitic dianhydride and hexachloroendomethylenetetrahydrophthalic anhydride.

The invention can in principle be applied to all systems which can be processed as thermosetting resins and which contain at least one component which can form a casing which is stable to atmospheric air and moisture and sufficiently stable mechanically, for the constituents of the system which are sensitive to air and moisture or for the liquid constituents of the system. The invention is thus, for example, also applicable to mixtures curable by peroxides, such as, for example, unsaturated polyester resins. Here again it is a prerequisite that the unsaturated polyester resin used, or a corresponding mixture, should have the necessary properties for such a protective casing.

Such suitable unsaturated polyesters can be produced, for example, by reaction (esterification in a known manner) of maleic anhydride, phthalic anhydride, 1,3-di-(hydroxyethyl)-4,5,6,7-tetrabromobenzimidazolone and ethylene glycol or polyethylene glycol. A corresponding curing agent can be, for example, butyl perbenzoate (preferably a 50 percent strength suspension in dimethyl phthalate). The polyester of which the outer shell consists can have a special cavity for further components (A). An example of a suitable further component (A) is trimethallyl isocyanurate. The shell furthermore contains a solution of cobalt naphthenate in an organic solvent (for example an alkylbenzene), uniformly distributed over the composition.

In principle, the protective casing (that is to say the component (A)) according to the invention can consist of a reactive precondensate, prepolymer or preadduct. Such pre-reacted products in general have a sufficiently high melting point and have the requisite strength.

If it should happen, in some cases, that the encasing composition of the multi-component system according to the invention is insufficiently stable mechanically at ordinary room temperature, because of a degree of creep or plastic behaviour, this disadvantage can in most cases be eliminated by storing the system at lower temperatures, that is to say in refrigeration chambers or cabinets, until it is used.

The multi-component systems according to the invention are in general used by fusing the requisite amounts of the mouldings according to the invention, thoroughly mixing the constituents of the mixture and pouring the melt or dispersion, thus produced, into a mould or applying it for gluing or laminating purposes, and curing the composition.

In some cases, it is also possible to dissolve the mouldings in organic solvents and to arrive at high polymer solutions as a result of the reaction taking place in solution. In such cases, crosslinking at normal room temperature can at times also be carried out.

A particular preferred form of the present invention comprises systems which are specifically casting resin systems. However, if the multi-component thermosetting resin systems in the broader sense of the invention are combinations of substances which give highly viscous compositions after melting or softening, processing by other methods, such as, for example, by the hot pressing method, is also possible. In general, such cases require homogenisation of the fused viscous compositions in a kneader, on a mixing mill or by means of other suitable devices before actual use.

For accurate metering of the total composition to be employed it can be of advantage if the multicomponent mouldings according to the invention are available in several sizes. For carrying out the processing method, mouldings which are as large as possible are in that case initially introduced into the processing vessels or melting vessels. The ultimate accurate metering is then effected by using corresponding smaller mouldings.

The multi-component systems according to the invention are preferably of the same constructions as pralinés or dragées. The component (A) which is solid at room temperature and is stable to air and moisture forms the outer casing for the component (B) contained in the interior, which component is optionally reactive towards atmospheric air and is optionally liquid or plastic.

The multi-component thermosetting resin system according to the invention can, in cases in which all components of this system are substances which are solid at room temperature (a preferred form of the invention), also be in the form of a laminate in which several superposed, preferably plane-parallel, plates, or several tubes which are pushed one inside the other, that is to say are arranged concentrically, consist alternately of the component (A) and the component (B). However, with such multi-component systems it is necessary that the outer plates or tubes should consist of the "protective" component (A) and that the laminate should be sealed air-tight by a layer of the component (A) at the sides or ends at which the individual layers project.

The invention is explained in more detail below in relation to the embodiments represented in the drawings; the drawings represent the following:

FIG. 1a: a simple dragée-like multi-component thermosetting resin system.

FIG. 1b: a dragée-like system which possesses, within the shell (casing), not only the cavity which contains the reactant (B), but also a further smaller cavity in which accelerators are accommodated.

FIG. 1c: a dragée-like system which possesses, in the solid core (reactant (B)), a smaller cavity in which accelerators are accommodated.

FIG. 2: a dragée-like multi-component thermosetting resin system in a "4-piece arrangement."

FIG. 3: a section through a carton in which a plurality of the multi-component mouldings (1-piece arrangement) is packaged.

FIG. 4: an arrangement of the cartons according to FIG. 3, suitable for packaging in containers.

Figure 5:
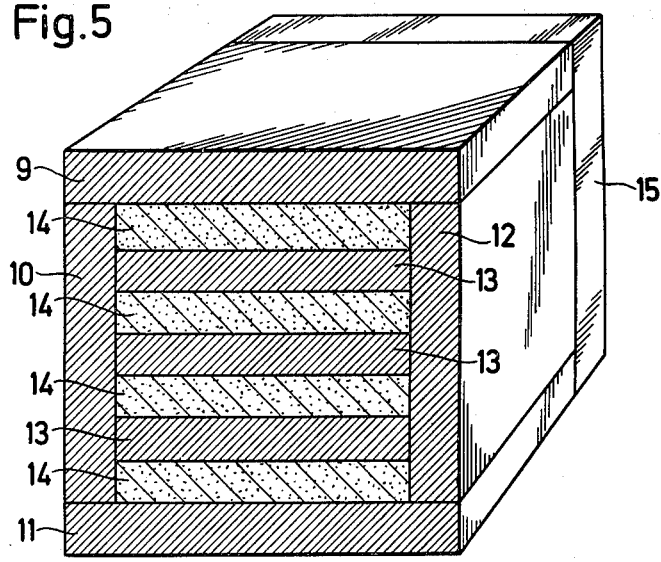

FIG. 5: a multi-component thermosetting resin system with a layer-like arrangement of the solid components (shown in section).

According to FIG. 1, the dragée-like multicomponent system consists of the casing or shell 1 which possesses a cylindrical cavity, and the solid cylindrical core 2 contained therein. The shell consists of 2 superposed flat halves which are welded or sealed at the edge. In the present example, the two halves are trapezoid bodies of exactly the same shape which each have a cylindrical recess on one of the sides of large area. In the "multicomponent dragée" they are fitted together in such a way that the two recesses point inwards and thus form the cylindrical closed cavity for receiving the core 2.

In FIG. 1b and 1c the smaller cavities in the outer shell 1 or in the core 2, in which the curing accelerators are accommodated, are marked 3.

The multi-component system shown in FIG. 2 is composed of 4 individual dragées. As in the case of a cream-filled bar of chocolate, the individual dragées can be separated simply by breaking.

According to FIG. 3, the dragée-like multicomponent systems ("1-piece arrangement") are stacked one above the other and are protected by a layer 4 of polystyrene foam against temporary, more severe temperature fluctuations and also against damage due to impact, for example during transport. In the present case, all mouldings in the carton are additionally encased by a thin plastic film 5 to prevent them sticking together. The packaging material 6 consists of cardboard. In this figure, the multi-component systems according to the invention are marked with the figure 7.

According to FIG. 4, the cartons 6 are arranged next to one another and above one another, in a space-saving manner, on a pallet 8, such as are used for transport by means of fork-lift trucks. This permits economical storage and transport to the processing installations.

In FIG. 5, the outer plates 9, 10, 11 and 12 and a part of the plates accommodated in the interior (namely those marked 13), and also the front and rear plates, not shown in the figure, consist of the component (A). The remaining inner plates of the layer (namely those marked 14) consist of the component (B).

Multi-component systems, as illustrated in FIG. 1a, can in most cases be produced advantageously in the following manner:

The halves which form the shell 1 can be produced, for example, in an elegant and economical manner by a casting process which approximately corresponds to the known injection moulding process. The difference from the injection moulding process is that when manufacturing the shells it is not high polymers such as, for example, thermoplastics, having high melt viscosities, but monomers or oligomers with lower viscosities which are processed. When processing the latter substances it is in most cases desirable to effect the metering of the amounts of melt required for each casting by correspondingly metered application of gas pressure to the melt (at intervals of time). When manufacturing some other multi-component systems according to the invention, metering by means of a piston or screw, such as in the injection moulding process proper, will, however, also be usable.

The core 2 according to FIG. 1 can be produced in a known manner by customary processes, either by casting from the melt or preferably by pressing the corresponding powder. If it is produced by the pressing process, the tablets are preferably made in a tabletting machine. The pressure required for tabletting depends on the material to be processed. Where a mixture of phthalic anhydride and quartz powder is used as the curing agent composition for epoxide resins, pressures of about 1,300 to 3,000 kp/cm$^2$ are required. If phthalic anhydride without filler is pressed to form tablets of curing agent, a press pressure of 200 to 300 kp/cm$^2$ suffices. Frequently, warming to temperatures slightly below the melt temperature of the material of the core 2 in order to achieve sintering can be of advantage.

The multi-component system according to FIG. 1 is now made ready by pushing the core 2 into the cylindrical recess of one half of the shell 1 and then placing the second half of the shell 1, in the spatially inverted position, as a lid on top of the part which has already been prepared. After welding the two halves of the shell 1 at the outer edge, for example by means of a hot roller or a heated stream of inert gas, the phthalic anhydride core finds itself protected against atmospheric moisture within the shell 1 which is inert to air.

All individual processes required to produce the multi-component system can be automated so that continuous and economical production is possible.

A further method of manufacture of the dragées according to FIG. 1 starts from a perforated plate with cylindrical bores passing through it, the plate consisting of the component (A) or of a mixture containing the component (A). These perforated plates can also be produced by an injection moulding process. However, it is also possible to start from larger plates which are punched or bored and then cut into smaller pieces. After filling the bores with cylindrical solid pieces of curing agent or with corresponding powders, the perforated plates are covered on both sides with non-perforated plates of the same material as the perforated plates themselves. Thereafter, the plates are joined and the entire structure sealed, by welding.

All further possible embodiments of the multicomponent system according to the invention, such as, for example, the laminates described earlier, can also be produced without difficulties, using modern moulding, pressing, casting, punching or cutting techniques. It is superfluous to deal more closely with details of such production processes here.

EXAMPLE 1

In the present example, the shell 1 of the multicomponent thermosetting resin system is built up of a mixture of 100 parts by weight of a bisphenol-A epoxide resin with an epoxide content of 2.4 epoxide equivalents/kg and 200 parts by weight of a quartz powder. The core 2 of the dragée consists of a mixture of 30 parts by weight of phthalic anhydride and 50 parts by weight of the quartz powder already mentioned. The ratio of the weight of the shell 1 to that of the core 2 is 300 : 80, so that 0.3 part of phthalic anhydride is present in the multi-component system per part by weight of bisphenol-A epoxide resin. A single dragée weighs 1,000 g.

Use of the dragée according to Example 1.

A casting mould for cylinders of 10 cm height and 10 cm diameter is heated to 140°C. A dragée according to this example is warmed to 140°C. After melting, the composition is stirred vigorously and the casting mould is then filled with this melt. The temperature is kept at 140°C for 5 hours. The mould is then cooled to room temperature and opened. A stable cylindrical epoxide resin body is obtained.

If the epoxide resin shell 1 or the tablet of curing agent (core 2) contains, in a further cavity, a tablet 3 of 0.2 part by weight of 2-methylimidazole as the accelerator (see FIG. 1b and 1c), the curing time at the same curing temperature is reduced to 15 minutes.

EXAMPLE 2

The shape and construction of the dragée-like multi-component thermosetting resin system again corresponds to that of FIG. 1. However, the shell 1 consists of a precondensate of a liquid bisphenol-A epoxide resin having an epoxide content of about 5.3 epoxide equivalents/kg and phthalic anhydride (PA) as well as quartz powder. (The manufacture of this precondensate (U) is described in more detail below).

The curing agent (core 2) consists of a mixture of 50 parts by weight of phthalic anhydride and 80 parts by weight of quartz powder according to Example 1.

The weight ratio of the shell 1 to the core 2 is 74 : 26. The total dragée weight is 1,000 g.

Instead of quartz powder, it is also possible to employ other customary fillers such as, for example, slate powder, chalk powder, alumina, metal powders, glass and pigments.

Manufacture of the precondensate (U)

100 parts by weight of the above bisphenol-A epoxide resin are mixed with 15 parts by weight of PA and 255 parts by weight of quartz powder and the mixture is brought to 150°C. A homogeneous melt results, which is kept at 150°C for 90 minutes. The precondensate which is thus produced is cooled to room temperature and stored. After being re-melted it can be processed at about 100°C, for example by the injection moulding process, to produce the shells 1 of the multi-component system.

EXAMPLE 3

The multi-component thermosetting resin system built up in layers is in the shape of a cube and the construction can be seen from FIG. 5 (section).

The outer dimensions of a 1,000 g unit are 83 × 83 × 83 mm. The dimensions of the side plates 10 and 12 are 57 × 57 × 13 mm; the base 11 and the lid 9 of the cube are 83 × 57 × 13 mm; the plates of curing agent 14 in the interior of the cube are 57 × 57 × 5.9 mm; the plates 13 in the interior of the cube are 57 × 57 × 11 mm; the front plate and the rear plate 15 of the cube are 83 × 83 × 13 mm.

The plates 9, 10, 11, 12, 13 and 15 consist of the same multi-component thermosetting resin systems as that used for the shell in Example 1. The plates of curing agent 14 consist of phthalic anhydride which is pressed under a press pressure of 200 – 300 kp/cm² to give the indicated dimensions.

The weight ratio corresponds to that of Example 1, that is to say 0.3 part of phthalic anhydride per 1 part of bisphenol-A epoxide resin (that is to say 0.8 equivalent of anhydride groups per 1 equivalent of epoxide groups).

The system is used analogously to Example 1 and here again, for example, 0.2 part of 2-methylimidazole can be added as an accelerator in the inner plates of curing agent or resin plates, in appropriate cavities or as a powder admixture.

EXAMPLE 4

The shape and construction of the dragée-like multi-component thermosetting resin system corresponds to that of FIG. 1a. However, the shell 1 consists of equal parts by weight of the solid bisphenol-A epoxide resin described in Example 1 and the precondensate described in Example 2, which starts from a liquid bisphenol-A epoxide resin and phthalic anhydride. The shell is brought to the desired dimensions by melting at approx. 120°C and casting in a cooled shell mould. It can be released from the mould after merely 1 – 2 minutes. The core 2 consists of 40 parts by weight of phthalic anhydride and 65 parts by weight of quartz powder. The weight ratio of the shell 1 to the core 2 is 335 : 105. The entire dragée weighs 5 kg.

The dragée can be used as described in Example 1, the cylindrical casting mould being correspondingly larger in accordance with the size of the dragee. Low shrinkage is a conspicuous characteristic of the moulded material thus obtained.

EXAMPLE 5

The shape and construction of the dragée-like multi-component thermosetting resin system corresponds to that of FIG. 1a. The shell A consists of a mixture of 100 parts by weight of the bisphenol-A epoxide resin described in Example 1, having an epoxide equivalent of 2.4 equivalents/kg, and 200 parts by weight of quartz powder.

The core consists of 4,4'-diaminodiphenylsulphone. The weight ratio of shell to core can be 0.082 – 1.2 parts of core per 1 part of the shell and corresponds to 0.8 – 1.2 equivalents of active hydrogen per equivalent of epoxide group.

The system is used analogously to Example 1, by melting and mixing the dragée at 150°C and then pouring into moulds prewarmed to 150° or 190°.

At 150°, the cured casting can be released from the mould after 6 hours, and at 190° after 3 hours. the moulded material is particularly suitable for uses entailing severe mechanical treatment and severe heat exposure, such as high voltage components and, in particular, chemically resistant coatings or laminates for technical uses.

EXAMPLE 6

The shell 1 of the multi-component thermosetting resin system consists of the bisphenol-A epoxide resin and quartz powder mixture described in Example 1. Instead of phthalic anhydride, the core 2 of the dragée contains 2 parts of a boron fluoride/amine complex (an addition product of boron trifluoride to trimethylhexamethylenediamine) per 100 parts by weight of bisphenol-A epoxide resin. The dragée weighs 1 kg.

Use of the dragée according to Example 6

A casting mould for plates of size 100 × 100 × 10 mm is brought to 160°C. After melting the dragée at 130°C, the composition is mixed vigorously and the casting mould is then filled with this melt. After curing for 16 hours at 160°C, the material is cooled to room temperature and released from the mould. The moulded material obtained has excellent electrical properties.

EXAMPLE 7

(Converse construction of the dragée)

The construction of the dragée corresponds to FIG. 1a. The component A of the shell 1 consists of a mixture of 75 parts by weight of hexachloroendomethylenetetrahydrophthalic anhydride and 25 parts by weight of phthalic anhydride. In addition, 100 parts by weight of quartz powder are mixed into component A. To produce the shell 1, the polycarboxylic acid anhydride mixture is melted at approx. 120°C, the quartz powder is stirred in and the mixture is then poured into an appropriate shell mould, cooled to room temperature and released from the mould.

The core 2 consists of 100 parts by weight of the bisphenol-A epoxide resin described in Example 1 and having an epoxide content of 2.4 equivalents/kg, and 180 parts by weight of quartz powder.

The weight ratio is 0.9 part by weight of polycarboxylic acid anhydride curing agent to 1 part by weight of bisphenol-A epoxide resin, corresponding to 1.0 equivalent of anhydride groups per 1 equivalent of epoxide groups. The weight of the dragée is 250 g.

Use of the dragée according to Example 7

The dragée is melted at 150°C and the melt is cast in a hollow cylinder casting mould of 10 cm height, 10 cm external diameter and 8.5 cm internal diameter, which has been prewarmed to 160°C. After curing for 1 hour at 160°C, the moulding is released. The moulded material obtained displays excellent self-extinguishing properties and is largely resistant to chemicals.

EXAMPLE 8

The construction of the dragée corresponds to FIG. 1b. The shell 1 of the multi-component thermosetting resin system consists of a homogeneous mixture of 100 parts of an unsaturated polyester E (component A), 50 parts of quartz powder and 0.5 part of an 8 percent strength cobalt naphthenate solution in alkylbenzene.

The shell 1 contains trimethallyl isocyanurate, as an additional component (A1), in a cylindrical cavity 2, and a suspension of 2 parts of 50 percent strength butyl perbenzoate (component B) (in dimethyl phthalate) and 6 parts of quartz powder in a further cylindrical cavity 3. The weight ratio of the shell 1 to the trimethallyl isocyanurate in the cavity 2 to the curing agent mixture in the cavity 3 is 1:0.2:0.05.

The dragée weighs 500 g.

Use of the dragée

The dragée is melted at 120°C and the melt is cast in a hollow cylinder casting mould of 20 cm height, 10 cm external diameter and 8.5 cm internal diameter, which has been prewarmed to 150°C, and released from the mould after curing for 1 hour at 150°C. The resulting moulded material is largely non-inflammable and has excellent chemical resistance to acid.

Manufacture of the unsaturated polyester E 1 mol of maleic anhydride and 0.3 mol of phthalic anhydride are melted in a customary esterification apparatus under a stream of nitrogen. A mixture of 0.4 mol of polyethylene glycol (molecular weight 600) and 0.9 mol of 1,3-di-(hydroxyethyl)-4,5,6,7-tetrabromobenzimidazolone is added at 80°C. The mixture is then warmed to 150°C over the course of 1 hour. the temperature is then raised to 210°C over the course of 14 hours whilst continuing to stir. After cooling to 180°C, 100 mg of hydroquinone are added. The composition is poured onto a metal sheet. The solid product thus obtained has an acid number of 15.

What we claim is:

1. A storage-stable multi-component thermosetting resin system consisting of a moulding, possessing at least one closed cavity, of at least one component (A) of this multi-component system, the component being solid at room temperature, inert to atmospheric air and fusible through raising the temperature, and a filling of this cavity, comprising at least one solid or liquid reaction partner (B) of the component (A) for thermosetting resin crosslinking, preferably at temperatures above 20°C, with, optionally, both the component (A) and the component (B) or one of the two components containing customary additives to the mixture, such as fillers, plasticisers, dyestuffs and catalysts, accelerators and inhibitors of the curing reaction, and the ratio of the amounts of the component (A) to component (B) and optionally to the catalysts, accelerators and inhibitors in this multi-component system preferably being the same as in customary thermosetting resin processing of the particular corresponding mixtures.

2. A multi-component thermosetting resin system according to claim 1, characterised in that the component (A) consists only of a reaction partner for component (B) for thermosetting resin crosslinking.

3. A multi-component thermosetting resin system according to claim 1, characterised in that the component (A) consists of several reaction partners for the component (B) for thermosetting resin crosslinking.

4. A multi-component thermosetting resin system according to claim 1, characterised in that the moulding of the component (A) possesses, in addition to the closed cavity in which the reactants (B) are accommodated, at least one further cavity in which a curing accelerator is accommodated.

5. A multi-component thermosetting resin system according to claim 1, characterised in that all components (A) and all components (B) are substances which are solid at room temperature.

6. A multi-component thermosetting resin system according to claim 5, characterised in that the solid filling of the cavity of the moulding with the components (B) possesses at least one cavity in which a curing accelerator is accommodated.

7. A multi-component thermosetting resin system according to claim 1, characterised in that the component (A) is a solid polyepoxide compound or a mixture of solid epoxide compounds and that the component (B) is a curing agent or a mixture of curing agents for the epoxide compounds and/or a catalyst or catalyst mixture for the anionic or cationic polymerisation of the epoxide compounds.

8. A multi-component thermosetting resin system according to claim 7, characterised in that the solid polyepoxide compound is a polyglycidyl compound and the component (B) is a curing agent, containing active H atoms, for the epoxide compounds, and the multi-component system contains 0.8 to 1.2 equivalents of active hydrogen atoms per 1 equivalent of epoxide groups.

9. A multi-component thermosetting resin system according to claim 7, characterised in that the solid polyepoxide compound is a polyglycidyl compound and the component (B) is an anhydride of an organic polycarboxylic acid, and the multi-component system contains 0.6 to 1.5, preferably 0.8 to 1.1, equivalents of acid anhydride groups per 1 equivalent of epoxide groups.

10. A multi-component thermosetting resin system according to claim 9, characterised in that the polyglycidyl compound is a solid bisphenol-A epoxide resin and the anhydride of an organic polycarboxylic acid is phthalic anhydride.

11. A multi-component thermosetting resin system according to claim 10, characterised in that the component (A) is a mixture of 100 parts by weight of a bisphenol-A epoxide resin having an epoxide content of about 2.2 to 2.7 epoxide equivalents/kg and up to 400 parts by weight of pulverulent silica, preferably quartz powder, and that the component (B) is a mixture of 20 to 40 parts by weight of phthalic anhydride and up to 400 parts by weight of pulverulent silica, preferably quartz powder.

12. A multi-component thermosetting resin system according to claim 7, characterised in that the solid polyepoxide compound is a precondensate of a low molecular polyepoxide compound and a polycarboxylic acid anhydride or an aromatic polyamine with, preferably, 2 primary amino groups and the precondensate preferably has an epoxide content of 5.0 to 4.0 epoxide equivalents/kg.

13. A multi-component thermosetting resin system according to claim 1, characterised in that the component (A) is a curing agent or a mixture of curing agents for epoxide compounds and/or a catalyst or a mixture of catalysts for the anionic or cationic polymerisation of epoxide compounds and that the component (B) is a polyepoxide compound or a mixture of epoxide compounds.

14. A multi-component thermosetting resin system according to claim 1, characterised in that the component (A) is a solid unsaturated polyester or a mixture of solid unsaturated polyesters and that the component (B) is a curing agent, preferably an organic peroxide, or a mixture of curing agents for the solid unsaturated polyester, and the component (A) preferably contains a further component (A1) which can be copolymerised during curing.

15. A multi-component thermosetting resin system according to claim 1, characterised in that it has the construction of a praliné or of a dragée and the casing consists of the component (A) and the filling of the component (B) or of the components (B).

16. A multi-component thermosetting resin system according to claim 1, characterised in that it consists of several superposed, preferably plane-parallel, plates or concentrically arranged tubes, with the plates or tubes consisting alternately of the component (A) and solid components (B) and the outer plates or the outer tube consisting of the component (A) which is inert to atmospheric air, and with the entire body being sealed airtight by a layer of the component (A) which is inert to air.

17. A multi-component thermosetting resin system according to claim 1, characterised in that it is a casting resin system.

* * * * *